March 1, 1960 L. J. SCHMAUCH 2,926,520
THERMAL CONDUCTIVITY CELL
Filed Jan. 16, 1956 5 Sheets-Sheet 2
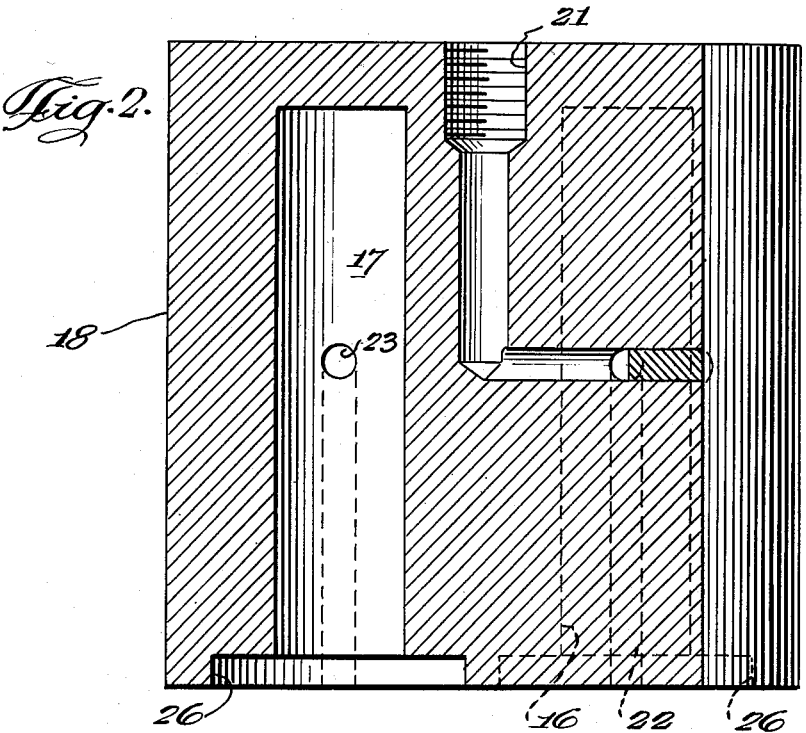
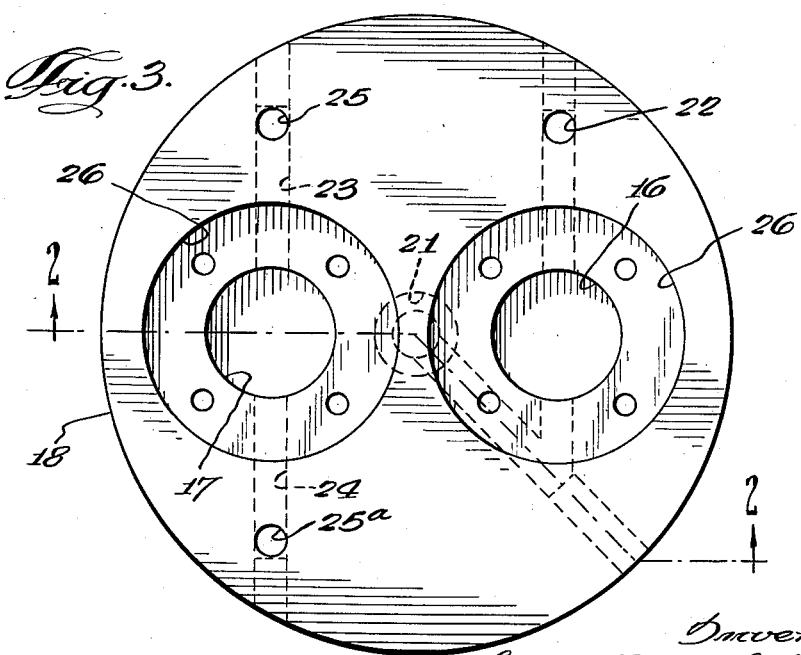
Inventor
Lorenz James Schmauch
By Everett A. Johnson
Attorney

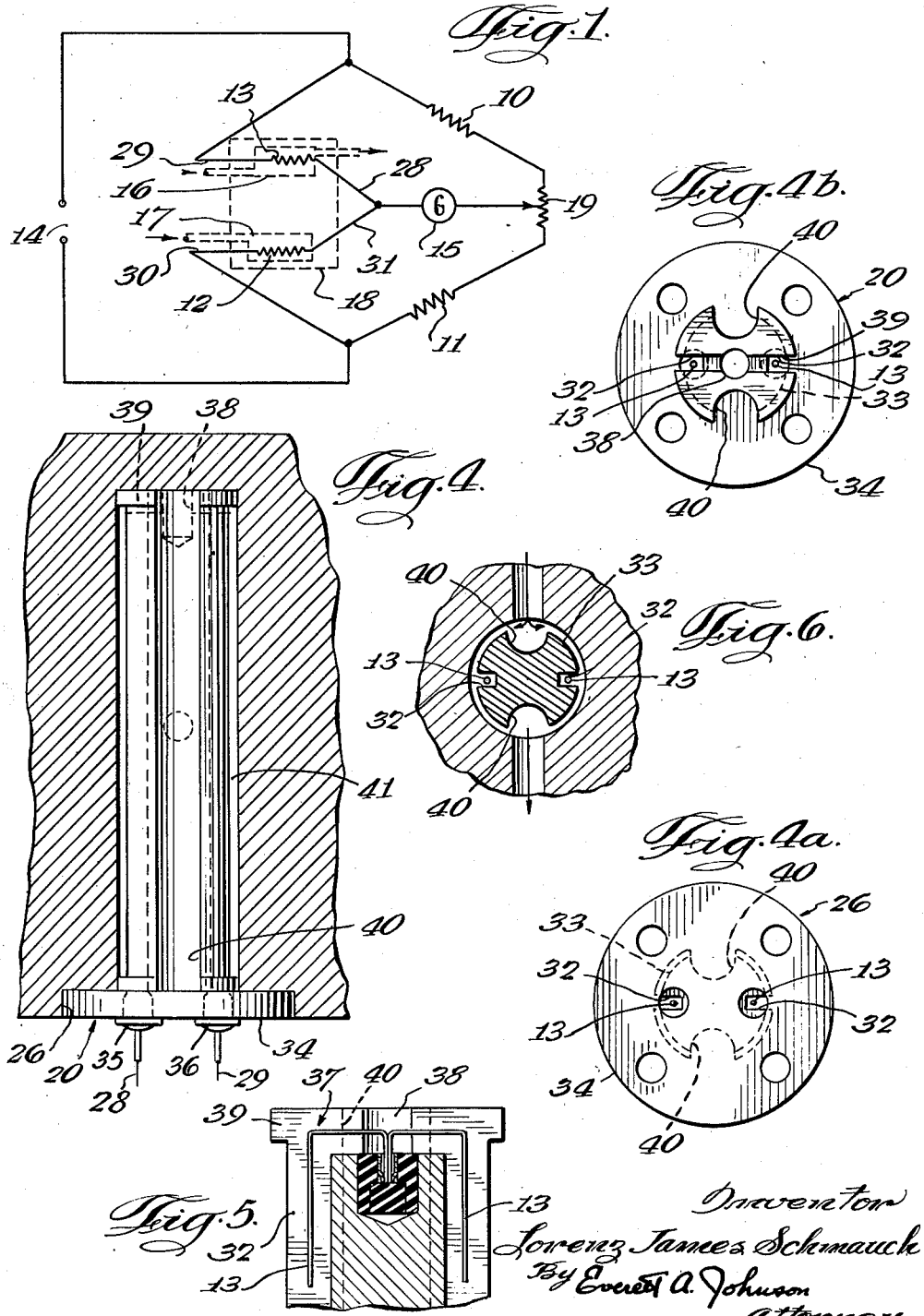

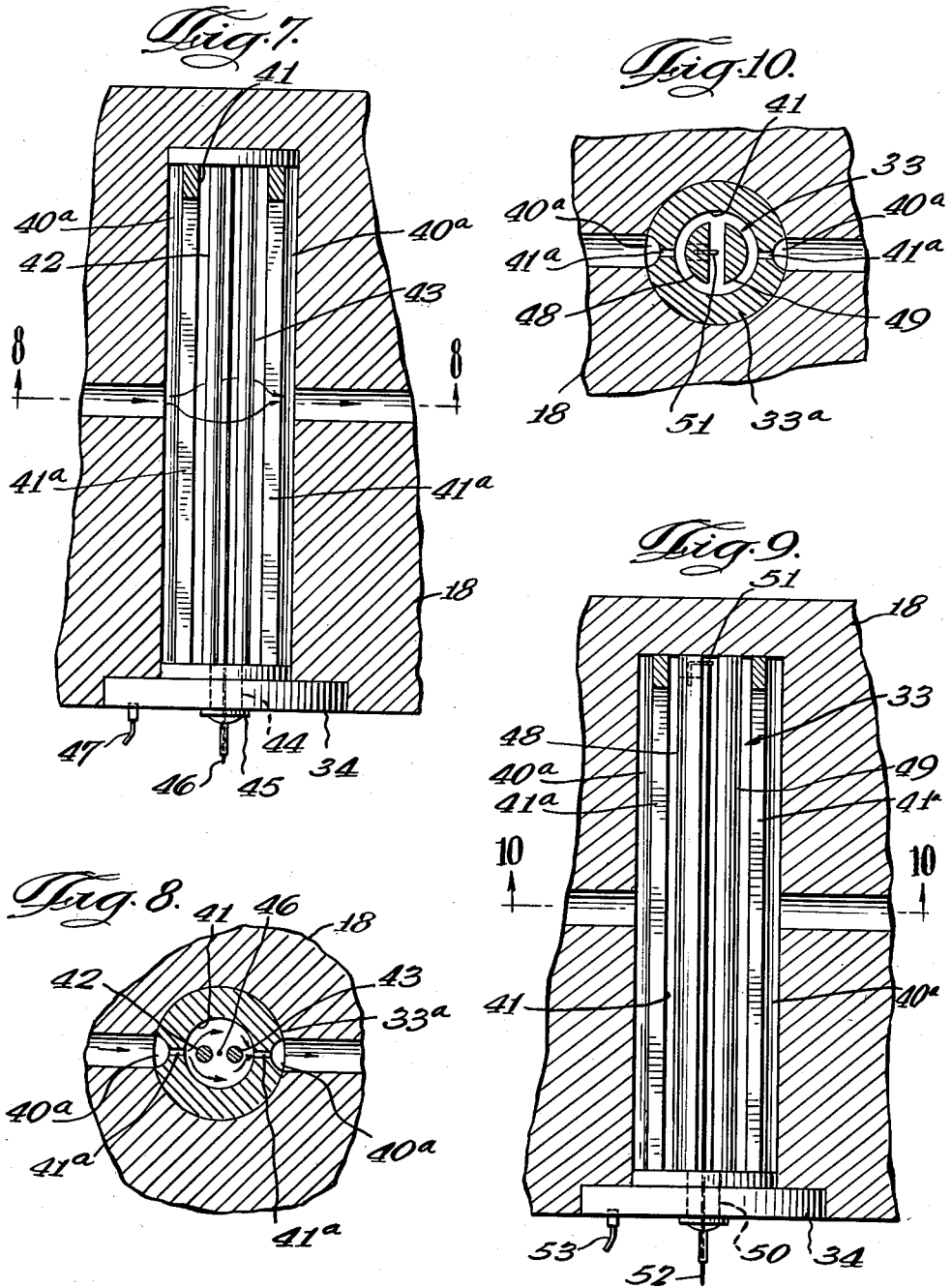

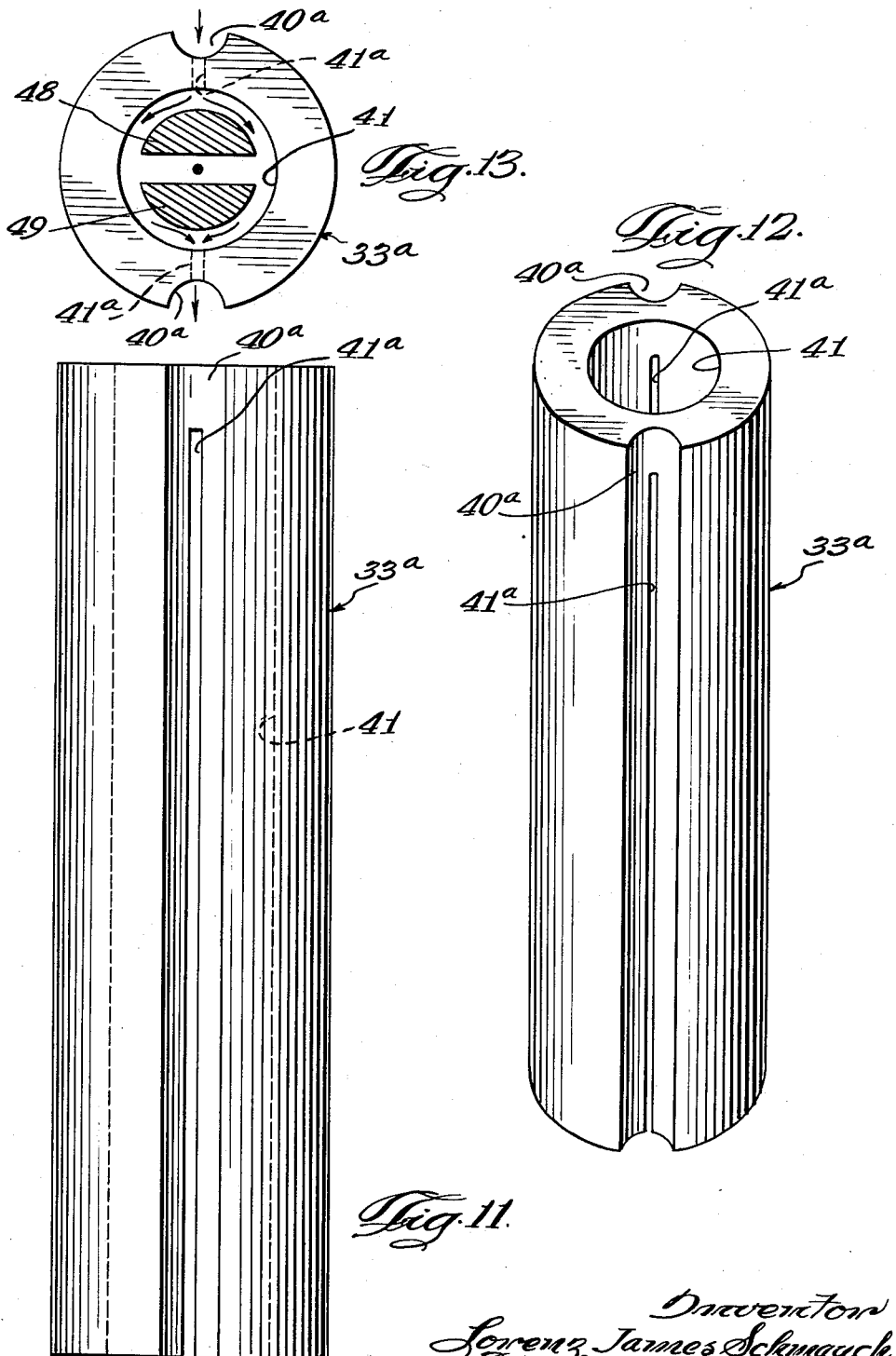

March 1, 1960 L. J. SCHMAUCH 2,926,520
THERMAL CONDUCTIVITY CELL
Filed Jan. 16, 1956 5 Sheets-Sheet 5

Inventor
Lorenz James Schmauch
By Everett A. Johnson,
Attorney

2,926,520
THERMAL CONDUCTIVITY CELL

Lorenz James Schmauch, Whiting, Ind., assignor to Standard Oil Company, Chicago, Ill., a corporation of Indiana Application January 16, 1956, Serial No. 559,225

7 Claims. (Cl. 73—27)

This invention relates to the analyses of gases by means of measuring their thermal conductivity.

The analysis of gases for a quantitative determination of gas mixtures by measurements of thermal conductivity is a rather highly developed art. In general, such systems determine the thermal conductivity of a fluid from the changes in resistance resulting from variations in the temperature of an electrical resistance or resistor element heated by an electric current flowing through the resistor and cooled by said fluid which conducts heat from the resistor. The cooling of a resistor by a gas stream depends upon the composition of the gas and upon the rate of flow of the gas in the region of the resistor.

The instrument conventionally used to measure the relative thermal conductivity, and hence composition of gases, is a thermal conductivity Wheatstone bridge wherein matched resistors are exposed to a reference gas and a test gas.

Thermal conductivity cells using the hot-wire method include two wires of high temperature coefficient of resistance supported within separate chambers of a metal block. The wires are insulated electrically from the block and are disposed within separate chambers which are provided with ports for gas entry and exit. The resistors are connected in a Wheatstone bridge circuit and a voltage is supplied to the circuit to elevate the temperature of the hot-wires above that of their surroundings. The temperature the hot-wires attain for a given supply voltage depends primarily upon the amount of heat lost to the chamber walls through the conductivity of the surrounding gas. When the same gas is present in both chambers, the bridge circuit can be adjusted to a zero output voltage. When the gas composition in the measuring chamber is changed, the resulting hot-wire temperature change alters the resistance of the enclosed wire and this further results in an output voltage that is a measure of the gas composition change.

More practical applications of these techniques require a continuous flow of gas through the measuring chamber of the cell. When the flow is directly over the wire, the forced cooling of the wire results in an undesirably high output voltage. If the unwanted output was steady it could be cancelled by electrical rebalancing, but inherent fluctuations in flow rate produce fluctuations in the output voltage that reduce the accuracy of the thermal conductivity measurement.

One solution to such flow sensitivity heretofore proposed has been to provide an identical flow of reference gas to the reference chamber. This reduces the undesirable effect, but it is difficult to attain a complete cancellation. A second proposal has been the re-arrangement of gas entry to the measuring chamber so that the gas composition in the measuring chamber changes through gas diffusion. However, undesirable long times are required for these cells to respond to composition changes and this is a disadvantage in applications where gas composition changes rapidly and must be followed closely.

For example, in gas chromatography the response of the cell must be fast if the true peak heights representing separated components in a gas stream are to be measured. Further, when it is desired to recover pure components, there is some mixing of the separated components within the cell and the zero level between peaks is not attained. In addition, the overlap of closely adjacent peaks can interfere with calculations of the concentrations.

In view of the above, it is a primary object of my invention to provide a thermal conductivity cell which is designed to reduce sensitivity to flow rate while retaining a fast response. A further object of the invention is to provide a thermal conductivity cell which is particularly suited for gas chromatography. Another object of the invention is to provide a method and apparatus for measuring thermal conductivity of gas and vapor mixtures wherein the effect of rate of flow is avoided while being highly responsive to composition changes. These and other objects of the invention will become apparent as my description thereof proceeds.

Briefly, I attain the objects of my invention by providing thermal conductivity cells where the hot wires are shielded from the direct gas flow but located close enough to the measured stream for good response. Such shielding may be obtained by placing barriers in the flow path both upstream and downstream of the hot-wire. The desired flow distribution is obtained by a low resistance path followed by a higher resistance path. This spreads the flowing stream over the active length of the wire and reduces the linear gas velocity for a given flow rate. Such flow distribution combined with the shielding reduces the flow sensitivity while proximity of the wire to the gas stream assures a fast response. The terms low resistance path and higher resistance path are relative terms and their absolute magnitude is determined by the maximum flow rate to be used but the higher resistance path is chosen as to avoid turbulence at the wire with the linear gas velocity used.

In a preferred embodiment, the desired flow distribution and flow insensitivity are obtained in the measuring chamber by a low resistance path comprising a slot coextensive in height with the length of the wire with the gas flow inlet at a midpoint of such slot and the higher resistance path is a relatively narrower channel or slot having a recess accommodating the wire. After passing through the narrower channel, the gas is discharged from the measuring cell.

Further details of the invention will be apparent as preferred embodiments thereof are described in connection with the accompanying drawings wherein:

Figure 1 is a schematic view of a thermal conductivity cell and circuit;

Figures 2 and 3 are side and bottom views, respectively, of a preferred cell block, Figure 2 being partly in section;

Figures 4, 4a and 4b are elevation, top and bottom views, respectively, of a preferred wire mount and flow distributor for use in the block of Figures 2 and 3;

Figures 5 and 6 are sectional views of portions of the structure shown by Figure 4;

Figure 7 is an elevation of a second embodiment of a wire mount and flow distributor employing shielding barriers;

Figure 8 is a fragmentary section of the apparatus in Figure 7;

Figure 9 is an elevation of a third embodiment of a wire mount and flow distributor according to my invention;

Figure 10 is a fragmentary section of the apparatus illustrated by Figure 9;

Figure 11 is a view of adapter for Figures 7 to 10;

Figure 12 is a perspective view of Figure 11;

Figure 13 is a top view of Figure 11 with elements 48 and 49 shown sectionally;

Figure 15:
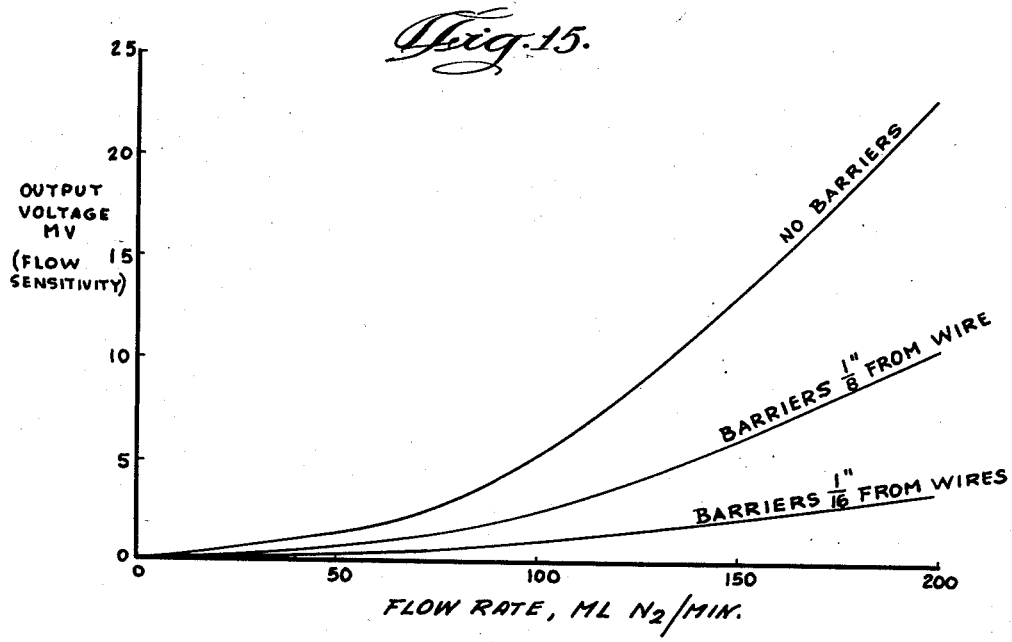
Figure 15 is a series of curves showing the beneficial effect of barriers on flow sensitivity.

Referring to Figure 1, there is shown a Wheatstone bridge circuit with standard resistances 10 and 11 and the analyzing resistance hot wires 12 and 13 together with the usual voltage supply 14 and an output voltage indicating means such as galvanometer 15. This general type of circuit and its operation are well known and will not be described in further detail.

The measuring chamber 16 contains the hot wire 13 and the reference chamber 17 contains the reference hot wire 12. The hot wires 12 and 13 are preferably precise lengths of platinum wire. The two chambers 16 and 17 are preferably contained within the same block 18 which may be cylindrical and may be enclosed within a vapor jacket for use with higher boiling hydrocarbon compounds.

Referring to Figures 2 and 3, I have illustrated a preferred form of a block 18 provided with reference and measuring chambers 17 and 16. The depth of the chambers 16 and 17 has been selected for compactness in design and low hold-up volume, each being about two inches in depth and about one-half inch in diameter to accommodate a wire mount and flow distributor 20, a preferred form of which is shown in Figures 4, 4a, 4b, 5 and 6.

The block 18 is provided with inlet channel 21 which enters one side of the chamber 16 at about its mid-point and leaves it by outlet channel 22, likewise communicating with the chamber 16 at its mid-point and leaving the block 18 from the bottom thereof. The reference chamber 17 is similar to measuring chamber 16 and is provided with ducts 23 and 24 communicating with the chamber 17 at a mid-point and terminating in valves 25 and 25a.

Each of the chambers 16 and 17 is provided with a recess 26 to receive the flanged unit 20 having electrical leads 28—29 and 30—31 connected to the indicated hot wire 12 or 13 in the Wheatstone bridge circuit as schematically shown in Figure 1. Each wire mount and flow distributor unit 20 illustrated in Figures 4 to 6, 7 and 8, and 9 and 10 has a means for distributing the gas flow over the full depth of the chamber 16 or 17 and for avoiding impingement of the hot wires by the flowing stream.

In Figures 4 to 6, the hot wire 12 or 13 is located within $\frac{1}{16}$ inch longitudinal slots 32 in the cylindrical body 33 which is fixed to the end flange 34. The leads 28—29 and 30—31 pass through the insulators 35 and 36 and are connected to wires 12 or 13 which pass upwardly within the slots 32 and are affixed to a spring mount 37 comprising an altered insulator carried within the end cavity 38, the transverse channel 39 connecting the lower ends of the slots 32 and accommodating the arms of spring mount 37.

Ninety degrees from each of slots 32 I provide a pair of diametrically opposed distributor channels 40 about $\frac{3}{16}$ inch in width, about 0.25 inch deep and the full length of the body 33. These distributor channels 40 are arranged opposite the inlet and outlet channels to the respective chambers 16 and 17. The chamber being $\frac{1}{2}$ inch in diameter and the flow distributor body 33 being $\frac{7}{16}$ inch in diameter, there remains an annular divided flow channel 41 wherein the gases flow adjacent the hot wires 12 and 13 in slots 32 but do not impinge thereon. However, the gases diffuse rapidly from the slots 32 into the annular flow channel 41 to give fast response.

By machining, the flow distribution and shielding body 33 is made symmetrical and provision is made for orientation of the channels 40 with respect to gas flow from inlet channel 21. In the embodiments of the body 33 illustrated in Figures 7 to 10, the distribution of the gas flow over the depth of the chamber is obtained by adapter 33a (Figure 11) having channel 40a and slot 41a, shielding being obtained by posts 42—43 and segments 48—49 as will be described.

With reference to Figures 7 and 8, the shielding of the gas flow over the depth of the chamber is obtained by posts 42 and 43 disposed upstream and downstream of the hot wire or filament. In Figures 9 and 10, the shielding barriers 48 and 49 comprise cylindrical segments with the hot wire between. The wire is supported at one end by insulator 44 in closure plate 34 and fixed to the base 45. The first lead 46 is connected to the filament through the insulator 44 and the second lead 47 is electrically connected to plate 34.

In Figures 9 and 10, the shielding barriers 48 and 49 comprise cylindrical segments with the hot wire between. The wire is supported at one end through insulator 50 and by recessed peg 51. Electrical connection is made by leads 52 and 53, lead 53 being electrically connected to the plate 34. For flow rates suitable for use in gas chromatography, the cell is not sensitive to flow even when the diffusion slot between the barriers 48 and 49 is rotated as far as 30° from the position shown in the drawings.

In each of the embodiments of the flow distributor shown by Figures 4 to 6 and Figures 9 and 10, the flow distribution is obtained by a low flow resistance path terminating the inlet channel 21, and a higher flow resistance path comprising narrow annular channels formed between the distributor elements and the wall of the cell or in an adapter sleeve. After passing through the annular channel, the gas is collected in outlet channel 22 and discharged from the chamber 16.

Figure 14:
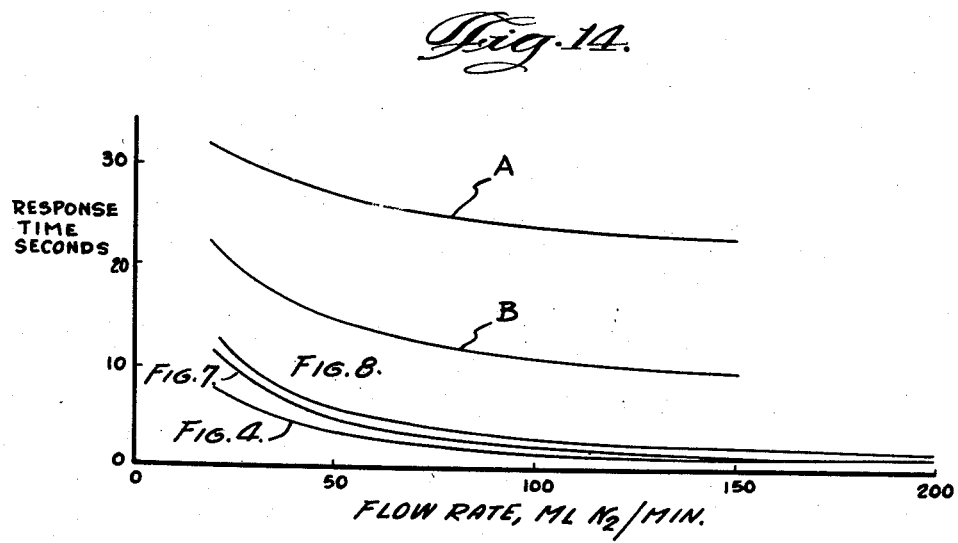
Figure 14 is a series of curves based on data which compares the cell responses of commercially available thermal conductivity cells and the cells employing the apparatus illustrated in Figures 4 to 10.

Figure 14 shows the response time v. flow rate for my thermal conductivity cells using various embodiments of the wire mount and flow distributors shown in Figures 2 to 10 as compared with two commercially available thermal conductivity cells A and B of a diffusion type. The response time is taken as the time required for the cell to give about 63% of its final output after the gas composition is changed at the entrance port 21. From Figure 14, it will be apparent that the response times of my cells are vastly improved over the two best commercial cells.

Figure 15 describes performance for a shielding geometry similar to that illustrated in Figures 7 and 8. With the geometry illustrated by Figures 4 to 6, a sensitivity of less than 0.1 millivolt at 200 ml. nitrogen/min. is obtained. It will be apparent from Figure 15, however, that I have provided a cell having greatly reduced sensitivity to rate of flow.

The performance illustrated in Figures 14 and 15 clearly indicates that I have attained the general and specific objects of my invention and have provided thermal conductivity cells which are of wide utility and extreme accuracy. However, the embodiment of the invention illustrated in Figure 4 provides nearly twice the output signal of the two illustrated by Figures 7 and 9 and, therefore, requires less signal amplification for the same wire temperature.

The invention has been described in terms of specific examples including a preferred embodiment set forth in some detail, but it should be understood that these are by way of illustration only and that the invention is not necessarily limited thereto. Alternative constructions will become apparent to those skilled in the art in view of my disclosure and, accordingly, modifications of my apparatus and operating techniques are to be contemplated without departing from the spirit of my described invention.

What I claim is:

1. An apparatus for conducting thermal conductivity analyses of flowing fluids which comprises a measuring chamber of generally cylindrical configuration, said chamber being closed at its opposite ends, an inlet port means discharging into said chamber at a point intermediate its ends, an outlet port means communicating with an intermediate portion of said chamber and arranged across from said inlet port means, hot wire filament means supported within said chamber and extending longitudinally thereof transverse to said inlet port means and said outlet port means, elongated flow barrier means adjacent to but spaced from said hot wire filament means, said flow barrier means being substantially coextensive in length with the axis of said chamber and providing a flow-sheltering bay for said hot wire filament means which filament is substantially insensitive to flow rates and which permits rapid diffusion of fluids about said hot wire filament.

2. The apparatus of claim 1 wherein said chamber comprises a cylindrical bore in a solid metal block closed at its upper end by a support for said hot wire, said inlet port means comprises a network of channels through said block in communication with about the mid-point of said chamber, and said outlet port means comprises a channel means communicating with said chamber and exterior of said block, said inlet and outlet channels having portions thereof substantially axially aligned.

3. A thermal conductivity cell comprising a metal block of high heat transfer capacity, a cylindrical bore extending inwardly from one surface of said block and closed at its lower end, a second bore through said block communicating with said first bore at a mid-point along its longest dimension, a third bore in said block communicating with a mid-point in said first bore, a filler plug having an outer diameter smaller than the inner diameter of said first bore thereby providing an annular channel, a first pair of cavities in said filler plug extending longitudinally thereof and disposed opposite said second and said third bores, a second pair of longitudinal cavities in said filler plug comprising slots at the periphery thereof and in communication with said annular channel, and two lengths of a hot wire filament disposed within said second pair of cavities, and electrical leads connected to said hot wire filament for connection in a Wheatstone bridge circuit.

4. A thermal conductivity cell comprising a metal block of high heat transfer capacity, a cylindrical chamber extending inwardly of one face of said block and closed at its inner end, a first conduit communicating with said chamber at substantially the mid-point of its depth, a second conduit communicating with said chamber at substantially the same depth as said first conduit and arranged opposite to it, a removable closure across the outer end of said chamber, a hot wire filament having one end extending through said closure, and flow barrier means carried by said closure and abutting the inner closed end of said chamber, said barrier means uniformly diverting flow of a sample stream through said chamber from said first conduit to said second conduit and shielding said hot wire filament from direct impingement by said stream, said barrier means comprising a cylindrical plug having an outer diameter smaller than the inner diameter of the chamber and a pair of diametrically spaced longitudinal recesses accommodating said hot wire filament.

5. A thermal conductivity cell comprising a metal block of high heat transfer capacity, a cylindrical chamber extending inwardly of one face of said block and closed at its inner end, a first conduit communicating with said chamber at substantially the mid-point of its depth, a second conduit communicating with said chamber at substantially the same depth as said first conduit and arranged opposite to it, a removable closure across the outer end of said chamber, a hot wire filament having one end extending through said closure, and flow barrier means carried by said closure and abutting the inner closed end of said chamber, said barrier means uniformly diverting flow of a sample stream through said chamber from said first conduit to said second conduit and shielding said hot wire filament from direct impingement by said stream, said barrier means comprising a pair of spaced cylindrical posts aligned between said first and second conduits with said hot wire filament disposed therebetween.

6. A thermal conductivity cell comprising a metal block of high heat transfer capacity, a cylindrical chamber extending inwardly of one face of said block and closed at its inner end, a first conduit communicating with said chamber at substantially the mid-point of its depth, a second conduit communicating with said chamber at substantially the same depth as said first conduit and arranged opposite to it, a removable closure across the outer end of said chamber, a hot wire filament having one end extending through said closure, and flow barrier means carried by said closure and abutting the inner closed end of said chamber, said barrier means uniformly diverting flow of a sample stream through said chamber from said first conduit to said second conduit and shielding said hot wire filament from direct impingement by said stream, said barrier means comprising a pair of spaced similar cylindrical segments, each having its planar surface arranged in spaced opposition with the hot wire filament disposed therebetween.

7. An apparatus for conducting thermal conductivity analyses of flowing fluids which comprises a measuring chamber of generally cylindrical configuration, said chamber being closed at its opposite ends, an inlet port means discharging into said chamber at a point intermediate its ends, an outlet port means communicating with an intermediate portion of said chamber and arranged across from said inlet port means, temperature sensitive electrically heated resistance element means supported within said chamber and extending longitudinally thereof transverse to said inlet port means and said outlet port means, flow barrier means adjacent to but spaced from said resistance element means, said flow barrier means being substantially coextensive in length with the axis of said chamber and providing a flow-sheltering bay for said resistance element means whereby said resistance element means is substantially insensitive to flow rates and whereby rapid diffusion of fluids is permitted about said resistance element means.

References Cited in the file of this patent

UNITED STATES PATENTS

| | | |
|---|---|---|
| 1,918,702 | Hebler et al. | July 18, 1933 |
| 2,298,288 | Gerrish et al. | Oct. 13, 1942 |
| 2,326,884 | Phelps | Aug. 17, 1943 |
| 2,557,008 | Poole | June 12, 1951 |
| 2,756,128 | Gerrish | July 24, 1956 |